US010078923B2

(12) United States Patent
Sallee et al.

(10) Patent No.: US 10,078,923 B2
(45) Date of Patent: Sep. 18, 2018

(54) EMBEDDED HOIST HUMAN-MACHINE INTERFACE

(71) Applicant: Tulsa Winch, Inc., Jenks, OK (US)

(72) Inventors: Eric Justin Sallee, Owasso, OK (US); David Lloyd McCarthy, Tulsa, OK (US); Shannon Jones, Cleveland, OK (US); Darren Scott Barnes, Tulsa, OK (US); Ian Christopher Hall, Cedar Falls, IA (US); Robert Jay Shallow, Jenks, OK (US); John W. Hassell, Tulsa, OK (US); Donald James McKay, Surrey (CA); Stephen Matthew Pollard, Tulsa, OK (US)

(73) Assignee: Tulsa Winch, Inc., Jenks, OK (US)

( * ) Notice: Subject to any disclaimer, the term of this patent is extended or adjusted under 35 U.S.C. 154(b) by 589 days.

(21) Appl. No.: 14/733,529

(22) Filed: Jun. 8, 2015

(65) Prior Publication Data
US 2015/0379783 A1 Dec. 31, 2015

Related U.S. Application Data

(60) Provisional application No. 62/009,030, filed on Jun. 6, 2014, provisional application No. 62/031,710, filed on Jul. 31, 2014.

(51) Int. Cl.
*B66D 1/54* (2006.01)
*G07C 3/00* (2006.01)
(Continued)

(52) U.S. Cl.
CPC ............. *G07C 3/00* (2013.01); *B66C 13/16* (2013.01); *B66D 1/30* (2013.01); *B66D 1/54* (2013.01); *G01L 3/00* (2013.01)

(58) Field of Classification Search
CPC ....... B66C 13/16; B66C 15/06; B66C 15/065; B66D 1/38; B66D 1/58; G01L 3/24
See application file for complete search history.

(56) References Cited

U.S. PATENT DOCUMENTS

| 3,804,371 A | 4/1974 | Mills et al. |
| 3,969,714 A | 7/1976 | Greer |

(Continued)

OTHER PUBLICATIONS

Mohd, Ehmer Khan, "A Comparative Study of White Box, Black Box and Grey Box Testing Techniques", "International Journal of Advanced Computer Science and Applications", pp. 12-15, vol. 3, No. 6.

*Primary Examiner* — Emmanuel M Marcelo
(74) *Attorney, Agent, or Firm* — David G. Woodral; GableGotwals

(57) ABSTRACT

A cable drum receives a length of working cable that is wound in and out from the drum in response to powered rotation of the drum with an uppermost layer of working cable on the drum forming a working surface. A torque sensor in communication with the cable drum measures a torque applied to the cable drum due to tension on the working cable from a load. A drum height gauge is provided for measuring a height of the working surface of the cable on the cable drum. A processor receives the torque value from the torque sensor and the height of the working surface from the drum height gauge and computes a force applied to the length of working cable due to the load based on the torque and height of the working surface. The work performed by the cable may be calculated to assist in determining cable health.

10 Claims, 7 Drawing Sheets

(51) Int. Cl.
    *B66D 1/30*     (2006.01)
    *G01L 3/00*     (2006.01)
    *B66C 13/16*     (2006.01)

(56) References Cited

U.S. PATENT DOCUMENTS

| | | |
|---|---|---|
| 4,058,295 A | 11/1977 | Morfitt |
| 4,345,742 A | 8/1982 | Morfitt |
| 4,501,335 A | 2/1985 | Gann |
| 5,190,250 A | 3/1993 | Delong et al. |
| 5,209,414 A | 5/1993 | Clemens et al. |
| 5,456,268 A | 10/1995 | Bonutti |
| 5,970,906 A | 10/1999 | Hrescak et al. |
| 6,062,106 A | 5/2000 | Jackson et al. |
| 6,089,357 A | 7/2000 | Jackson et al. |
| 6,668,668 B1 | 12/2003 | Peshkin |
| 6,916,267 B2 | 7/2005 | Jones et al. |
| 7,097,155 B2 | 8/2006 | Jackson et al. |
| 7,219,879 B2 | 5/2007 | Jackson et al. |
| 7,489,098 B2 | 2/2009 | Harris et al. |
| 7,671,547 B2 | 3/2010 | Addleman |
| 7,679,242 B2 | 3/2010 | Parameter et al. |
| 8,766,812 B2 * | 7/2014 | Pereira ............... B66B 5/12 340/668 |
| 2007/0089925 A1 | 4/2007 | Addleman |
| 2008/0038106 A1 | 2/2008 | Spain |
| 2010/0201970 A1 | 8/2010 | Pellen |
| 2010/0236107 A1 | 9/2010 | Kanzler et al. |
| 2010/0318294 A1 | 12/2010 | Rosing et al. |
| 2011/0024378 A1 * | 2/2011 | Pleuss ............... B66C 13/18 212/276 |
| 2012/0290226 A1 * | 11/2012 | Williams ............ G01L 5/103 702/41 |

\* cited by examiner

EMBEDDED HOIST HUMAN-MACHINE INTERFACE

CROSS-REFERENCE TO RELATED CASES

This application claims the benefit of U.S. provisional patent application Ser. No. 62/009,030, filed on Jun. 6, 2014 and U.S. provisional patent application Ser. No. 62/031,710, filed on Jul. 31, 2014, and incorporates such provisional applications by reference into this disclosure as if fully set out at this point.

FIELD OF THE INVENTION

The present disclosure relates to winches and hoists in general and, more specifically, to a system for determining force applied to a working cable during lifting or pulling.

BACKGROUND OF THE INVENTION

Modern cranes are ubiquitous to the construction and manufacturing industries. In the past, cranes relied on operator experience and charts in order to determine safe operating limits including boom angles, load capacity, and other operating parameters. Now, computers aid operators in quickly determining whether a given load or lift is safe under current conditions.

In addition to knowing what tasks are safe to undertake, it is also important to know the current load or work being performed by the crane in order to ensure that the crane is operating under acceptable and safe parameters. Currently, in order to know the load placed on a crane, sensors may be placed within a hydraulic ram or piston that moves and stabilizes the boom in the vertical direction. However, this requires placement and wiring (or other communication means) between the boom and other measuring devices and computers that are normally located elsewhere on the crane. For example, cranes are often already outfitted with devices such as load moment indicators (LMI) and drum rotation indicators (DRI).

Some components of cranes and associated systems have a limited service lift, which may be based on usage or total work performed. An example of such a component is the rope or cable used to lift loads. Over time the cable may stretch, weaken, or otherwise become compromised from normal work and wear and tear. Knowing when such items are due for replacement or inspection is important to reliable operation of crane or winch systems.

What is needed is a system for addressing the above and related concerns.

SUMMARY OF THE INVENTION

The invention of the present disclosure, in one aspect thereof, comprises a system having a cable drum that receives a length of working cable that is wound in and out from the drum in response to powered rotation of the drum with an uppermost layer of working cable on the drum forming a working surface. A torque sensor in mechanical communication with the cable drum measures a torque applied to the cable drum due to tension on the working cable from a load. A drum height gauge is provided for measuring a height of the working surface of the cable on the cable drum. A processor receives the torque value from the torque sensor and the height of the working surface from the drum height gauge and computes a force applied to the length of working cable due to the load based on the torque and height of the working surface.

In some embodiments, the torque sensor measures the torque applied to a component within a torque path interposing the cable drum and a power source. The torque sensor may be a magnetic sensor. Some embodiments include a display device affixed proximate an end of the drum, the display device providing a numerical readout of the computed force on the working cable.

The drum height gauge may comprise a cable packer and/or an angle sensor. The processor may be incorporated into a load moment indicator, display, and/or a drum rotation indicator.

Some embodiments further comprise an electronic memory associated with the processor. The processor records into the memory a cumulative amount of work performed by the length of working cable. The work is defined in such case by the product of the force applied and the distance the load is moved by the length of working cable. The electronic memory may contain a cumulative work limit associated with the length of working cable and the processor provides an alarm to an operator when the cumulative amount of work performed by the length of working cable passes a predetermined fraction of the cumulative work limit.

The invention of the present disclosure, in another aspect thereof, comprises a system having a powered cable drum that receives a working cable strung onto a boom to lift a load on the boom and that is wound onto the drum such that the load is raised and lowered in response to rotation of the drum. The system includes a torque sensor that is mechanically connected to the cable drum and that measures a torque applied to the cable drum due to tension on the working cable from a load suspended from the boom, and a gauge for measuring a cable height of the cable relative to the cable drum. The system includes a processor that receives the torque from the torque sensor and a cable height from the gauge and computes a force applied to the length of working cable due to the load based on the torque and the cable height.

In some embodiments, the processor is in electrical communication with a drum rotation indicator. The processor may calculate an amount of work performed by the working cable utilizing the computed force and rotation data from the drum rotation indicator. The system may include an electronic memory associated with the processor. The processor stores into the memory a cumulative amount of work performed by the length of working cable. The electronic memory may contain a cumulative work limit associated with the working cable. The processor compares the cumulative work against the work limit and provides a notification when the cumulative work exceeds a predetermined threshold relative to the cumulative work limit. The processor may comprise a part of a load moment indicator computer.

The invention of the present disclosure, in another aspect thereof, comprises a device including a crane having a boom that suspends a load with a working cable. A cable drum is proximate an opposite end of the boom from the load. The working cable is wound onto the drum such that the load is raised and lowered in response to rotation of the drum. A torque sensor is in mechanical communication with the cable drum so as to determine an amount of torque applied to the cable drum through the working cable. A cable height gauge determines the height of working cable wound into the cable drum, and a processor utilizes the torque and the cable height to determine a force applied to the working cable by the load.

In some embodiments, the processor comprises a component of a load moment indicator computer. The processer may utilize data provided by a drum rotation indicator to compute and store into memory a quantity of work performed.

DETAILED DESCRIPTION OF THE PREFERRED EMBODIMENTS

Various crane designs may rely on a load moment indicator (LMI) system that derives the load on the crane hook while simultaneously displaying an allowable load value to the operator. This LMI, sometimes referred to as a rated capacity indicator (RCI), or rated capacity limiter (RCL), also displays the percentage of safe working load, the boom length, the boom angle, the swing angle, and the radius of the load from the centerline of rotation of the boom. The LMI also provides visual and audible warnings of overload, two-blocking, and other crane conditions. The LMI calculates and displays these values in real time, using values derived from multiple sensors on the crane, including boom hydraulic pressure sensors, boom angle sensors, boom length sensors, and swing rotation sensors.

Allowable load may be calculated from the boom length, boom angle, crane geometric data, and a crane-OEM-provided duty chart. The duty chart is a map of the allowable load for possible positions and configurations of the crane.

Central to the calculation of the load is the load-moment calculation. In the load moment calculation, the load is determined by dividing the load moment by the distance of the load from the center-line-of-rotation of the crane boom. This distance is also called the load radius. The LMI determines load moment by using the vertical component of the force on the boom cylinder along with other factors. Previously this vertical force component was derived through knowledge of the boom position, the geometry of the crane, and the pressure on the boom cylinder at a particular time. The LMI stores each crane's particular geometry in non-volatile electronic memory.

Commonly, LMI calculations occur on a computer referred to as the "LMI computer". The LMI computer is typically mounted on a boom of a crane or embedded in a display in the crane's cab and has various interface ports for electrical and pressure sensor inputs.

Figure 1:
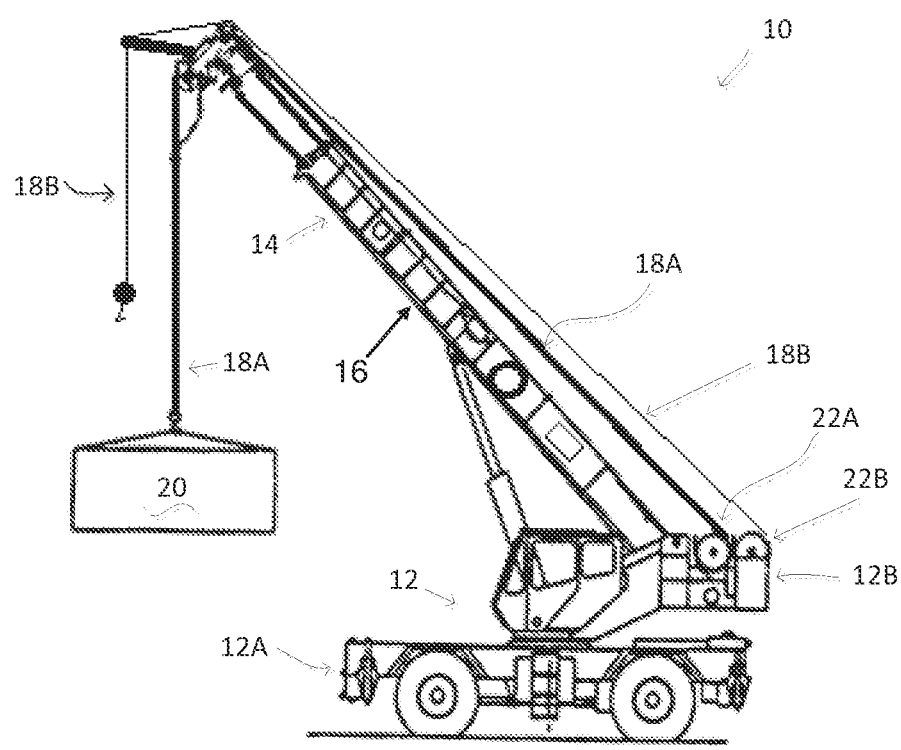
FIG. 1 is an elevation view of a crane having dual hoists.

The device and system of the present disclosure may be implemented on, or as a part of, a crane apparatus such as crane system 10 of FIG. 1, possibly replacement or supplementing all or part of the LMI. The crane system 10 may include a crane base 12, comprising frame 12A and turret 12B. In some embodiments these components are a vehicle, and a vehicle-mounted swivel mechanism, respectively.

A crane boom 14 may be hingedly mounted to turret 12B. The boom 14 may be raised and lowered (translated vertically) via a boom hydraulic cylinder 16. A cable 18A is supported by boom hydraulic cylinder 16 for affixing to a load 20 to be raised or lowered or otherwise moved. The cable 18A may be a steel cable, a woven steel cable, or other type of synthetic rope (and may also be referred to simply as a "rope" although a natural, traditional style rope would not normally be used in modern crane or winch applications).

The cable 18A is spooled onto hoist and cable packer assembly 22A. In one embodiment, an auxiliary cable 18B is also supported by boom cylinder 16. Auxiliary cable 18B is spooled onto auxiliary hoist and cable packer assembly 22B. Depending on the application, crane system 10 may be used with or without auxiliary hoist and cable packer assembly 22B. The auxiliary cable 18B may be of the same or a different type that cable 18A.

Figure 2:
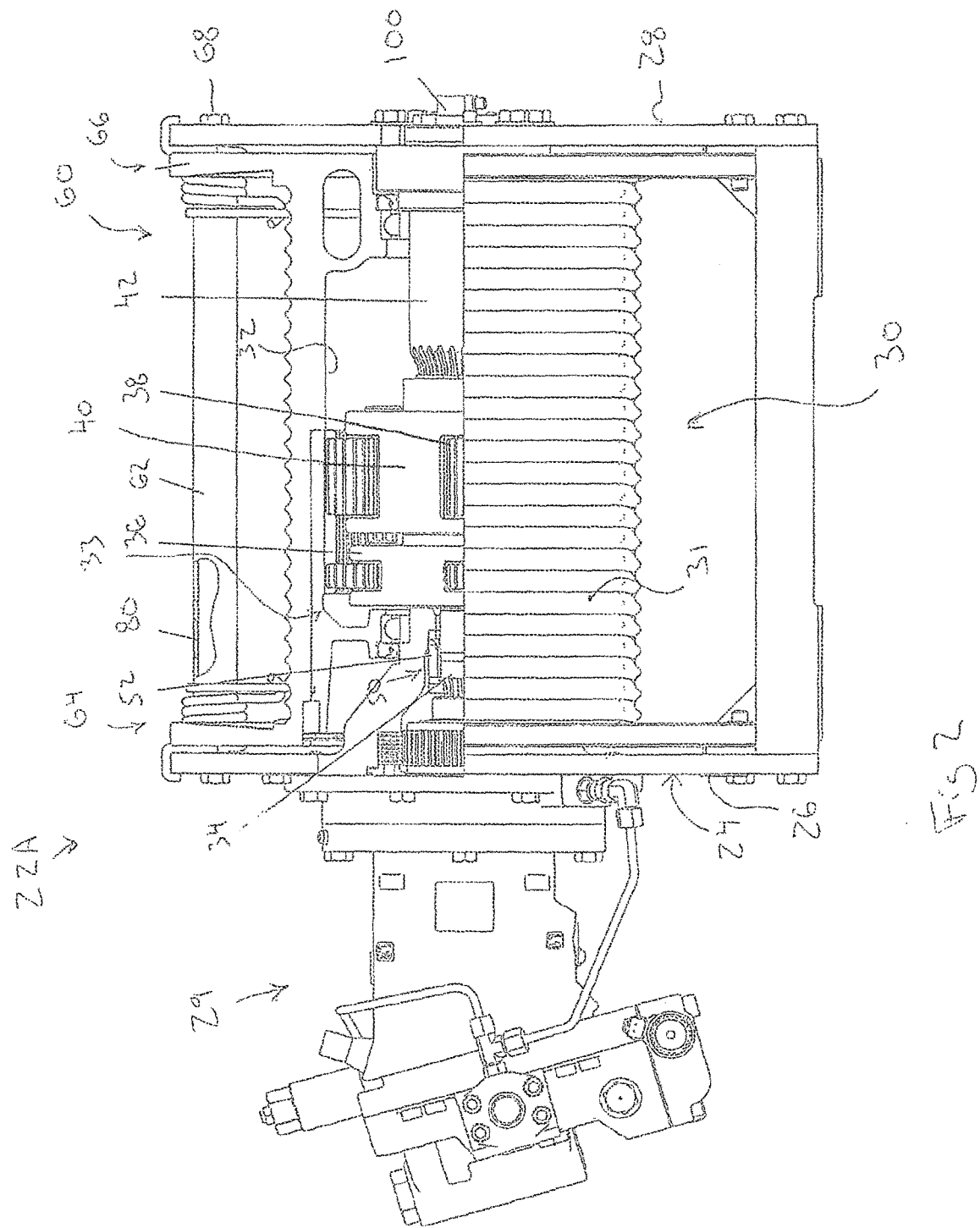
FIG. 2 is a partial cut-away elevation view of a first embodiment of a hoist and cable packer assembly utilizing the human-machine interface device of the present disclosure.
Figure 3:
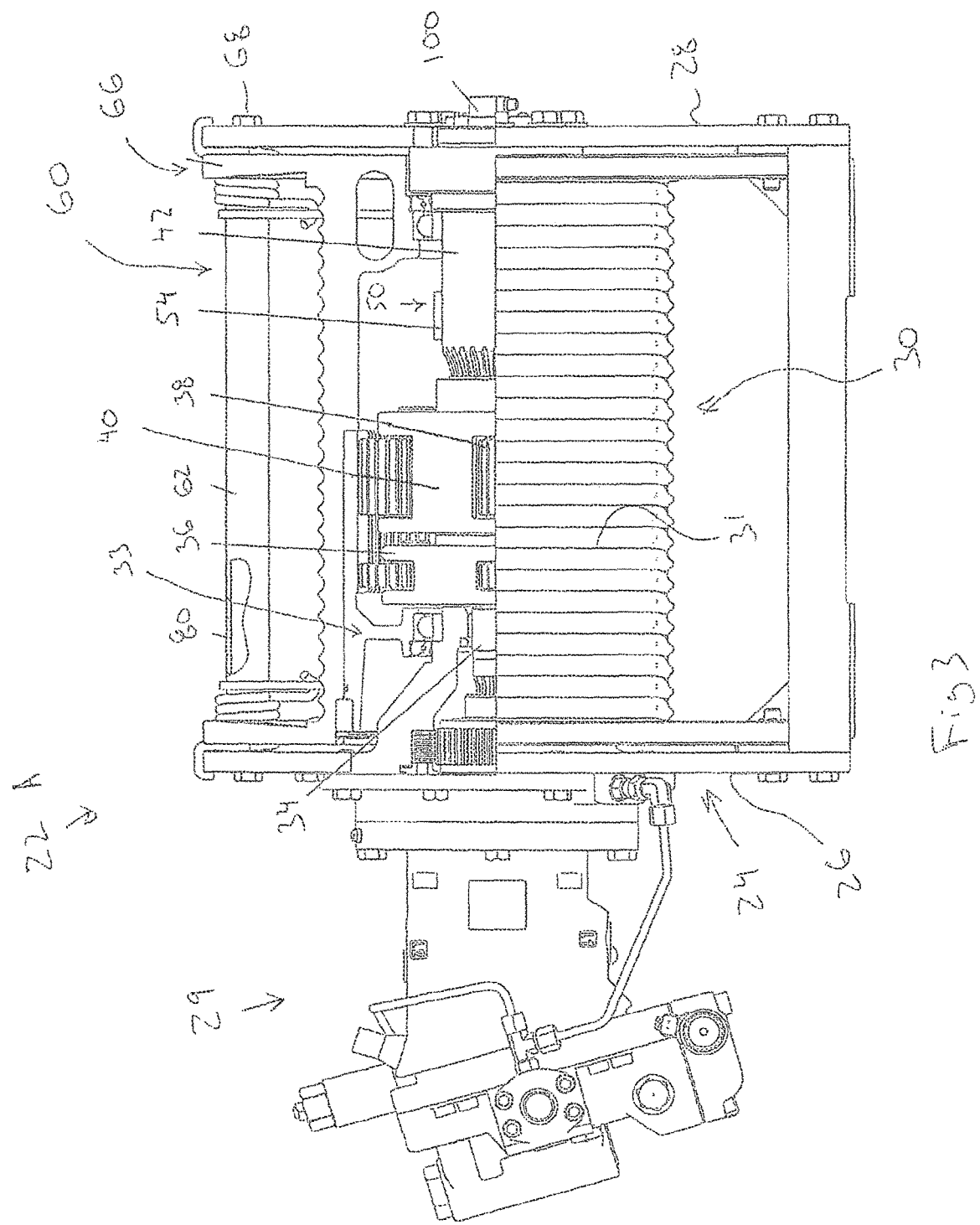
FIG. 3 is a partial cut-away elevation view of a second embodiment of a hoist and cable packer assembly utilizing the human-machine interface device of the present disclosure.
Figure 4:
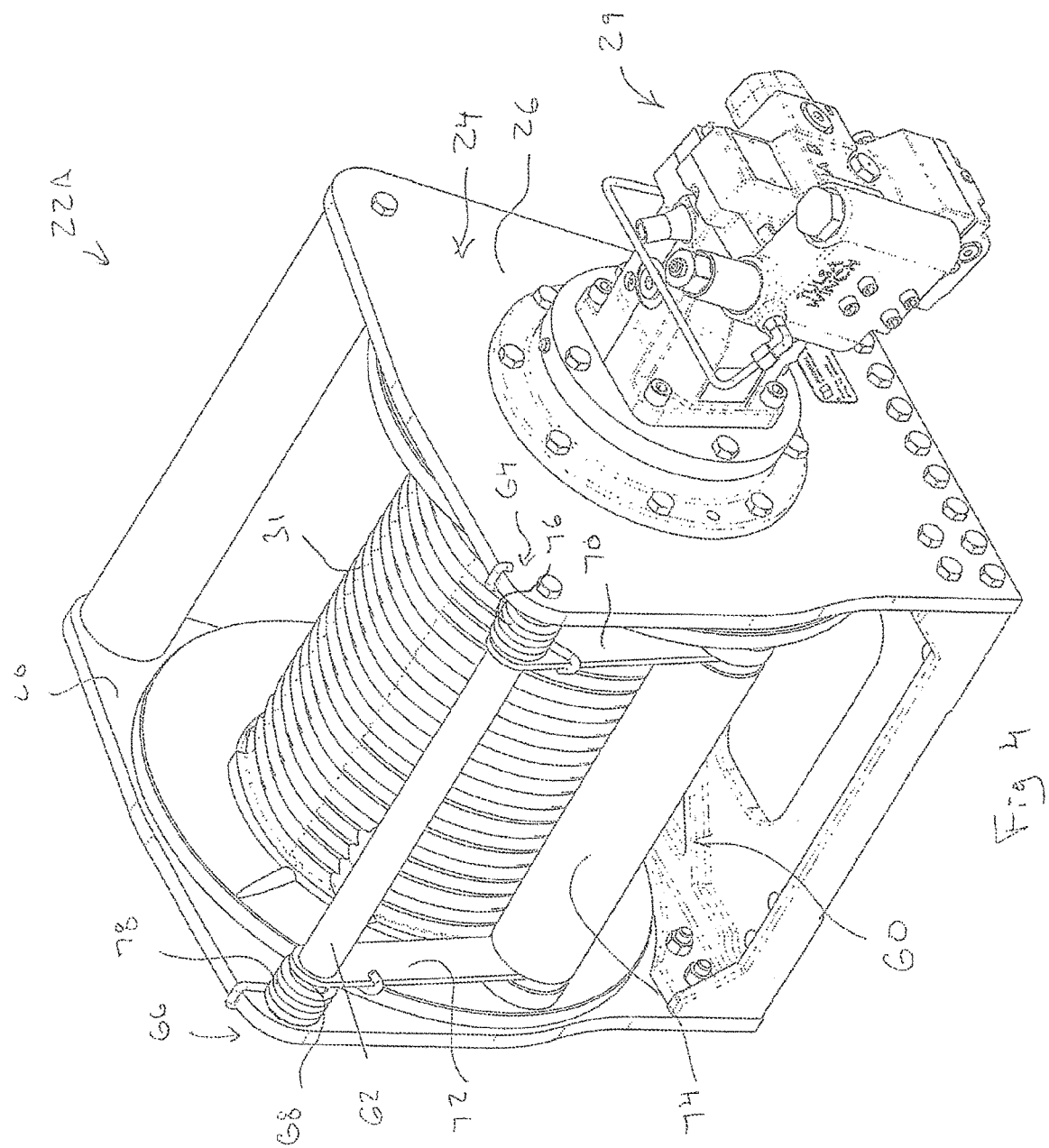
FIG. 4 is a perspective view of the hoist and cable packer assembly of FIGS. 2 and 3.
Figure 5:
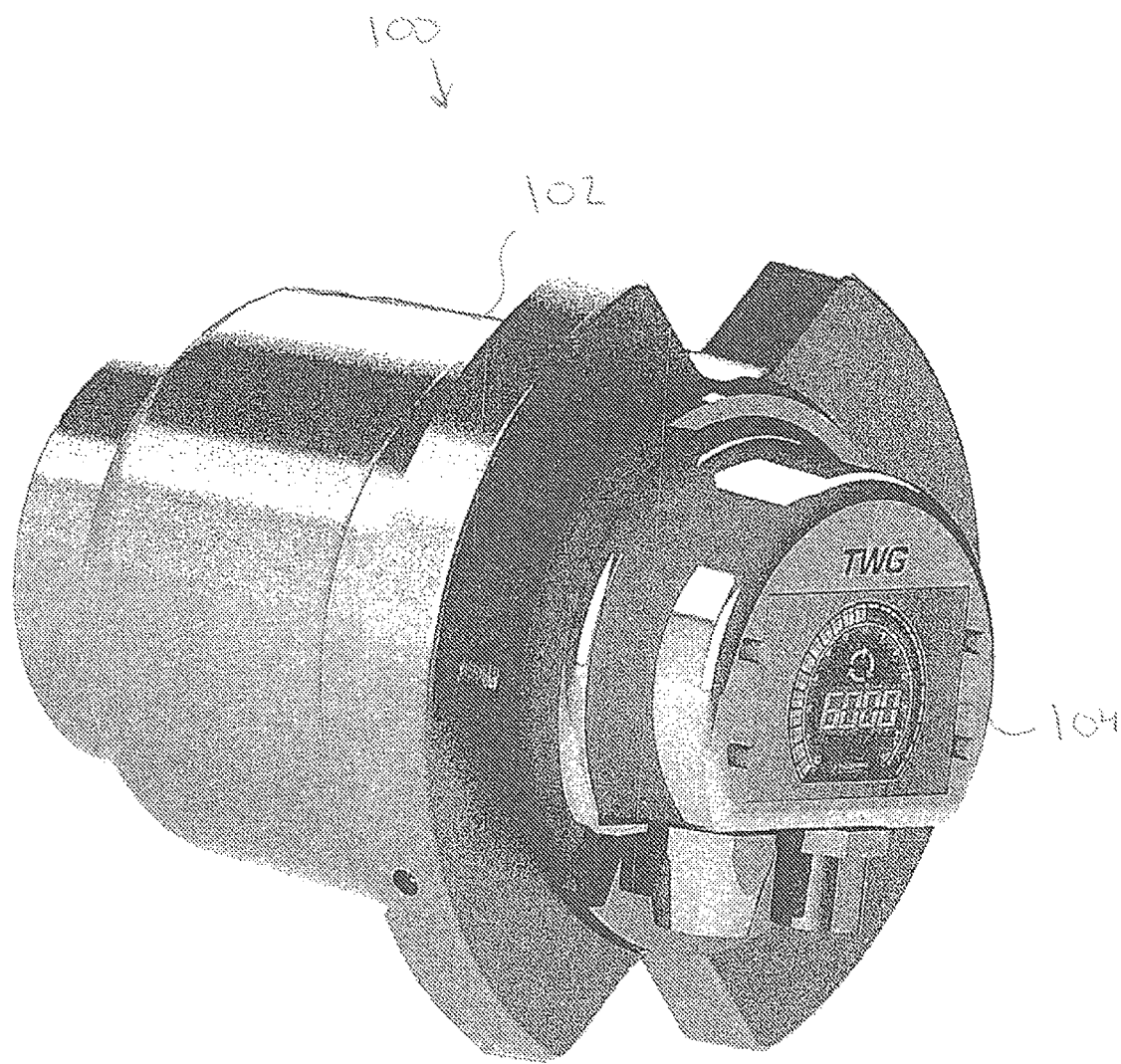
FIG. 5 is a perspective view of the human-machine interface device of FIGS. 2 and 3.

Referring now also to FIGS. 2-4, hoist and cable packer assembly 22A (which may be mounted to turret 12B) may include a housing assembly 24 having a first side plate 26 and a second side plate 28. A motor 29, which may be hydraulic, electrical, internal combustion, or of another type, may be affixed to first side plate 26. In an embodiment wherein auxiliary hoist and cable packer assembly 22B is also used, auxiliary hoist and cable packer assembly 22B may have the same elements as hoist and cable packer assembly 22A and may function in the same way. Consequently, common features retain the same element number.

A hoist 30 may be located between first side plate 26 and second side plate 28. The hoist 30 may be driven by an electric motor 29 (or other type of motor) for paying in and paying out cable 18 from a drum 31 (e.g., for winding and unwinding cable from the drum 31 to raise and lower loads). The hoist 30 includes a cable drum 31, which may be rotationally mounted in housing assembly 24. The cable drum 31 may be provided with grooves on an outer surface thereof for receiving cable 18. The cable drum 31 defines an interior compartment 32 on the inside of cable drum 31. In some embodiments, the interior compartment 32 defines interiorly facing teeth, known as a ring gear (not shown), on an inside surface of cable drum 31. The ring gear interfaces with a drive train 33 for imparting movement to the cable drum 31.

The hoist drive train, designated generally 33, is located within interior compartment 32 of cable drum 31. The hoist drive train 33 of the present example is a double reduction planetary drive train. However, other types of drive trains may also be used, including compound planetary, or single or triple reduction planetaries, or other types. In one embodiment, hoist drive train 33 includes input sun gear 34, input planet gears and carrier 36, output sun gear 38, and output planet gears and carrier 40. Input sun gear 34 communicates with motor 29 for receiving torque from motor 29. Input planet gears and carrier 36 communicates with input sun gear 34 for receiving torque from input sun gear 34 and for providing gear reduction. Output sun gear 38 is in communication with input planet gears and carrier 36 for receiving torque from input planet gears and carrier 36. Output planet gears and carrier 40 is in communication with output sun gear 38 for receiving torque from output sun gear 38, and for providing gear reduction, and for communicating with the ring gear with internal teeth on inside surface of cable drum 31. In some designs, the input planet gears and carrier 36 also communicate with the ring gear. Output shaft 42 is in communication with the output planet gears and carrier 40.

A torque sensor 50 may be provided for measuring torque within hoist drive train 33 and/or cable drum 31. In one embodiment, torque sensor 50 is an input sensor 52 (FIG. 2), which is located adjacent to input sun gear 34. In another embodiment, torque sensor 50 is an output sensor 54 (FIG. 3) located on output shaft 42. Torque sensor 50 may be based on strain gauge, magnetic field fluctuation, or other technologies.

By providing a measurement of torque on a known component in the drive train 33, the torque applied to cable drum 31 can be ascertained (if not measured directly). Various torque sensors (including, for example, torque sensor 50 and torque sensor 52) may arranged and configured to measure torque at various points along what would be called the torque path. Components mechanically interposing (directly or indirectly) the drum 31 and the motor 29, and directly or indirectly experiencing torque applied by either or both of these components may be said to be in the torque path. Measuring the torque at any point in the torque path can provide the torque, for example, on the drum 31 if the relationships between the components are known, as they are in systems such as those of the present disclosure.

The cable 18 may spool onto cable drum 31 in multiple layers. Cable packers have various designs to keep the cable 18 in close contact with the bare cable drum 31 (also known as the called the first layer) as it rolls onto the drum or to keep the cable 18 in close contact with additional layers that rest on the layer of cable 18 below.

In the present embodiment a cable packer arm assembly 60 is affixed to housing assembly 24. The cable packer arm assembly 60 has a base member 62 having a first end 64 and a second end 66. The base member 62 of cable packer arm assembly 60 is rotationally mounted to cable packer assembly axle 68, which is affixed to first side plate 26 at a first end and is affixed to second side plate 28 at a second end. The cable packer arm assembly 60 further includes a first roller arm 70 and a second roller arm 72 (FIG. 4). A roller 74 is affixed to the first roller arm 70 and a second roller arm 72 of cable packer arm assembly 60.

A right spring 76 is located on cable packer assembly axle 68 in communication with the first side plate 26 and with the first roller arm 70. A left spring 78 is mounted on cable packer assembly axle 68 in communication with the second roller arm 72 and second side plate 28. The left spring 76 and right spring 78 are provided for biasing roller 74 against cable 18 that is wrapped around drum 31. A packer angle sensor 80 (FIGS. 2 and 3) may be positioned inside of base member 62 of cable packer arm assembly 60 for measuring a position of cable packer arm assembly 60 in relation to the cable drum 31.

The human-machine interface device 100 (FIGS. 2-6) may be received within interior compartment 32 of cable drum 31 and pass partially through second side plate 28 for external visibility. The human-machine interface device 100 may engage output shaft 42. The device 100 may include a housing 102 and a display 104. The display 104 may be a color liquid crystal display (LCD) visible on housing 102 or on any other location on or proximate to the hoist or winch.

Figure 6:
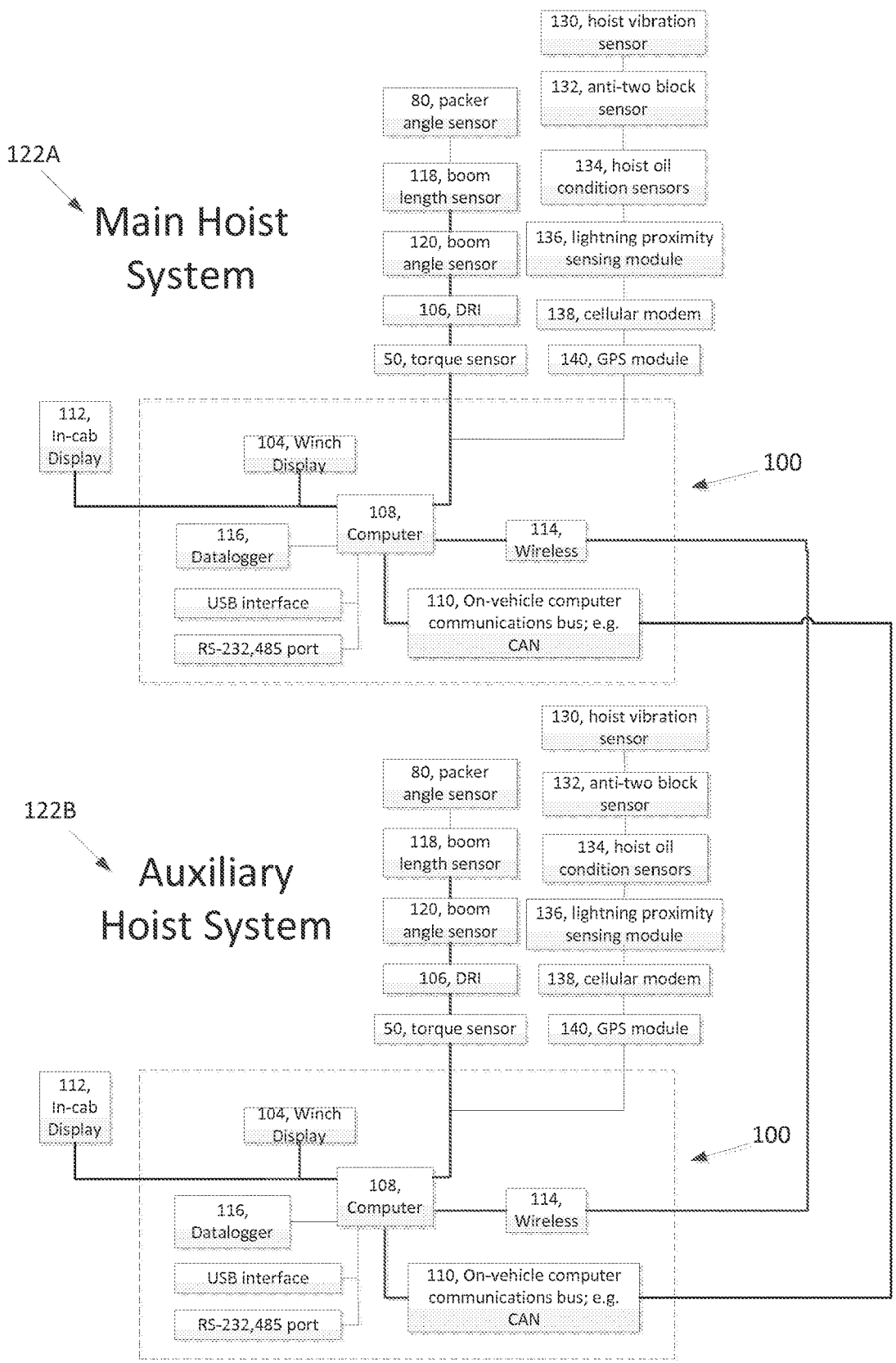
FIG. 6 is a schematic diagram of the human-machine interface device of FIGS. 1, 2, 3, and 5 and associated inputs and outputs.

The device 100 may include a drum direction and speed sensor 106 (FIG. 6) for measuring rotation of cable drum 31. Drum direction and speed sensor 106 communicates with a computer 108. In one embodiment, the computer 108 is connected to an on-crane computer network interface such as a CAN bus interface. In addition, computer 108 may be connected to another like device on another hoist on the same crane via an on-crane computer network, wireless sensor network, or a dedicated communication cable linking the two. Also, computer 108 may be connected to another like device on another hoist on a different crane on the same worksite via a wireless sensor network As can be seen in FIG. 6, the computer 108 additionally receives data from torque sensors 50 (e.g., input sensor 52 or output sensor 54) for calculating torque. The computer 108 may be a microprocessor with an associated electronic memory. In some embodiments, the computer 108 may be system-on-a-chip device incorporating volatile and non-volatile memory, a processor, and various I/O ports, D/A converters, A/D converters, and the like for communicating with the various sensors. In FIG. 6, two separate systems 100 are shown, associated respectively with the main hoist 122A and auxiliary hoist 122B. In various embodiments, the computer 108 is embedded with, or a component of, an LMI, a DRI, a display screen, or other piece of hardware. In other embodiments, the computer 108 may replace the LMI and/or DRI.

Figure 7:
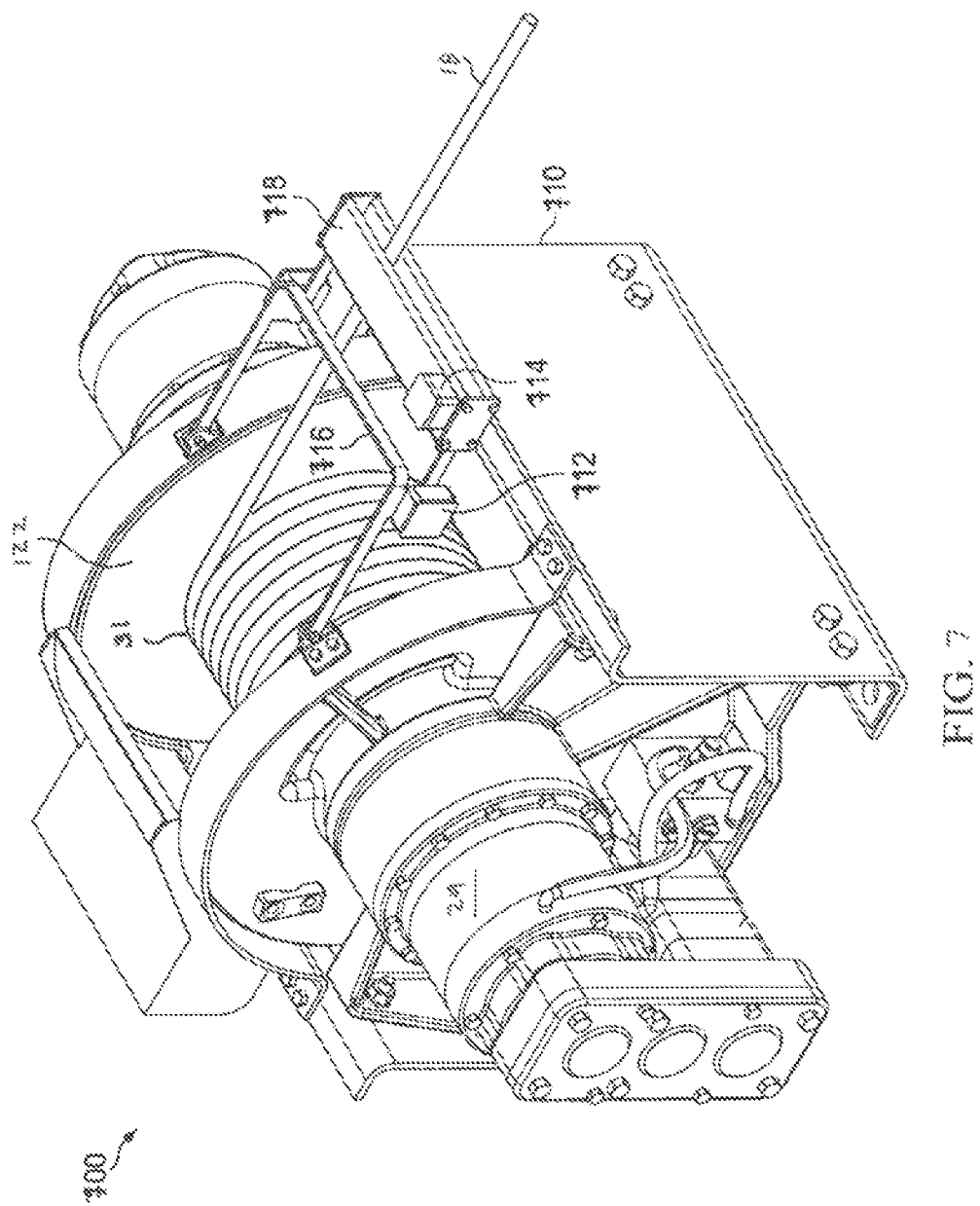
FIG. 7 is a perspective view of another embodiment of a hoist assembly suitable for use with various embodiments of the present disclosure.

In addition to the cable packers, other implements may be utilized to determine rope or cable height on a drum (which may be necessary for deriving force on the cable from measured torque, as described above). Referring now to FIG. 7, a perspective view of such an implement is shown. The device of 700 of FIG. 7 comprises a series of angle sensors 712, 714 mounted to a swing arm 716. One end of the swing arm 716 may be attached in a stationary relationship with respect to the drum 29. The angle sensors 712, 714 may be located opposite the stationary end and may be may be solid state electronic sensors. The sensors 112, 114 provide an electronic signal that is indicative of the angle at which the sensor lies relative to a baseline (e.g., the sensor may provide the angle relative to horizontal). As shown in FIG. 7, the first angle sensor 712 is located and configured to measure the angle of the cable 18 relative to the center of the drum 22. The second angle sensor 714 is located and configured to measure the angle of the cable 18 relative to the location where it pulls away from, or exits from, the drum 22.

Also mounted to the swing arm 716 is a line guide 718. In the present embodiment, the second sensor 714 is actually mounted to the line guide 718. The line guide 718 also serves to ensure that the angle sensors 712, 714 remain aligned with the cable 18 as it exits the drum 29. The angles measured by the sensors 712, 714 can be utilized to determine cable height relative to the center of the drum 31, as described in U.S. Patent Application Publication No. 2012/02090226, incorporated herein by reference as if set out herein in its entirety.

Referring now primarily to FIG. 6, an in-cab display 112 is also provided and may comprises a telematics interface. A wireless communication system 114 may be provided. In one embodiment, wireless communication system 114 is Bluetooth®. Other wireless communications systems may be used, such as IEEE 802.15.4, wireless sensor networks, or wireless mesh networks. Wireless communication system 114 allows for communication with equipment in a cab of turret 12B, with other equipment on the crane or on other proximate cranes in a wireless sensor network (see, e.g., FIG. 7, discussed below), or with crane spotters, riggers, or slingers nearby the crane during a lift. In one embodiment, a crane slinger is continuously notified of the crane safe-working-load-percentage via a wireless near-to-eye display module worn by the crane slinger. In another embodiment, wireless communication system 114 or a serial communications cable facilitates an ability to download hoist usage information to a hand-held or other computation device. Such information may be stored on data logger 116 that is in communication with computer 108.

Human-machine interface device 100 includes a power supply for connecting to a vehicle ignition system or other power supply. The human-machine interface device 100 may also include an LCD, OLED, LED, or heads-up display, wireless sensor or wireless personal area network functionality, non-volatile memory, electronic real time clock, hoist and ambient temperature sensors, a global positioning system (GPS) module, a cellular modem module, an RS-232 or RS-485 serial communication port, a Universal Serial Bus (USB) interface, a lightning-proximity sensing module, and an integrated near-to-eye display or equivalent interface. The device 100 provides information such as crane load moment indication functionality and data logging.

The capacity indicator on display 104 and/or in-cab display 112 shows data received from computer 108 in communication with computer network interfaces 110 or 114. Computer 108 receives data from cable packer angle sensor 80 or from multiple angle sensors as described in U.S. Patent Application Publication No. 2012/02090226, as well as from boom length sensor 118 and boom angle sensor 120. Benefits of calculating wire force using torque sensor 50 and cable packer angle sensor 80 and/or or multiple angle sensors via the methods set forth in US patent application publication No. 2012/02090226 include elimination of a need for a typical LMI computer box and removal of pressure transducers on a crane boom hydraulic cylinder 18, which results in simplification of crane hydraulics plumbing and simplification of crane wiring by eliminating, in some designs, multiple hydraulic and electrical wiring connections. The result is a substantial improvement in reliability, decrease in crane manufacturing time, complexity, and labor cost, and a decrease in service requirements.

Computer 108 may additionally receive data from other types of sensors including hoist vibration sensor 130, anti-two block sensor 132, hoist oil condition sensors 134, and a lightning proximity sensing module 136. Computer 108 may also communicate with cellular modem 138 and GPS module 140.

As set forth above, crane 10 may be used with hoist and cable packer assembly 22A (FIG. 1) as part of main hoist system 122A alone or may be used in conjunction with additional hoist and cable packer assembly 22B (FIG. 1) as part of auxiliary hoist system 122B. In an embodiment wherein both main hoist system 122A and auxiliary hoist system 122B are used, wireless systems 114 and computer network interfaces 110 of the respective systems communicate with one another.

Hoist and crane usage data stored on data logger 116 and/or computer 108 may provide instantaneous information related to hoist "health" and hoist overload detection for an operator. Because the human-machine interface device 100 is hoist mounted, the system may easily be monitored by preventive maintenance managers without requiring starting the crane engine or entering the crane cab.

Torque data from torque sensors 50 is relayed to computer 108 and/or data logger 116. In one embodiment, data logger 116 only records torque instances that are greater than a threshold percentage of a rated torque capacity of a winch, e.g., 80% of the rated torque capacity. System events such as power on, power off, clutch disengage, and clutch engage may also be recorded. Data stored in computer 108 and/or data logger 116 are useful to schedule crane maintenance. Cumulated winch and crane idle time statistics may be monitored by crane fleet managers, likely resulting in less fuel used and less frequent preventive maintenance.

Device 100 of the present disclosure receives, calculates, or has stored thereon, e.g., in computer 108, crane geometry, an OEM duty chart, boom length, boom angle and wire rope force. Device 100 then provides real time data related to allowable crane capacity and current load.

Torque, being defined as a force about a rotation point at a given distance, can be used to determine the amount of force causing said torque if the distance at which the force is applied is known. In the context of the present disclosure, torque applied to the cable drum 31 (e.g., about its central axis of rotation) is known by direct or indirect measurement as described herein (e.g., by torque sensors 50, 52, 54). Furthermore, a cable height gauge is provided by the cable packer angle sensor 80 (or the angle measurement systems described in U.S. Patent Application Publication No. US 2012/02090226). Knowing cable height and the size of the drum 31, the distance from the central axis of rotation of the force causing the torque is also known. The computer 108 or a processor contained therein can then easily make the calculation of the amount of force applied to the cable 18. Understanding that there can be some variation due to friction of the cable 18 winding over the end of the boom 14 the force applied to the cable 18 will closely match or be equivalent to the weight of the load 20.

In addition to the foregoing, the computer 108 can continuously store in memory, or the data logger 116, the amount of force applied to the cable 18. The DRI 106 provides data regarding the length of cable 118 being wound or unwound, and hence, the distance the load 20 is moved. Work may be defined as force multiplied by distance. Having access to both force and distance of the load 20, the work performed by the cable 18 can also be computed and/or stored.

The human machine interface 100 of the present disclosure facilitates collection of data such as real time hoist status and maintenance values, including actual hoist usage time and hoist duty cycle data, such as: hoist load profile over a specified period of time, hoist cumulative weight lifted over a specified period of time, type of hoist overload conditions, number of hoist overload instances, severity of hoist overload instances, average load factor, maximum hoist speed, ambient air temperature, hoist oil temperature, hoist oil viscosity, hoist oil water content, hoist oil acidity, hoist oil additive content, hoist oil wear particle content, load counts, crane and hoist idle time, excessive crane and hoist idle time, and load totals. The device of the present disclosure may also provide a visual indication of hoist service or impending service via a display, such as a light bar or LED indicator, and a color or monochrome computer display that may be mounted on the enclosure or elsewhere on the hoist or winch.

The computer 108 may have stored in memory a total amount of work for which a given cable 18 is rated. This may take into account fatigue of the cable 18 as it is pulled in a straight line or as is winds or unwinds over the boom 20 and/or drum 31. The computer 108 may continuously accumulate the total amount of work performed by the cable 18 as distances and forces are measured for each load lift. When the total amount of worked performed is within a given threshold of the rated work capacity of the cable 18, the computer 18 may provide a warning or an alarm (e.g., via in cab display 112 and/or display 104). Therefore an operator or an inspector will know when the cable 108 is due for replacement or inspection. Through interaction with the computer 108, the stored load parameters may be reset (e.g., when the cable 18 is replaced).

Another use the system 100 of the present disclosure is in monitoring synthetic or metal rope installation onto a hoist or winch in which a minimum tension must be maintained. During installation on some configurations, rope must be laid on the hoist drum under tension and at the proper rotation speed. The system 100 provides an "installation mode" in which it oversees the torque and speed on the hoist to assist in maintaining or monitoring the specified rope tension, speed, or other quality.

The system 100 may also be used as a control system for activities in which the attached hoist or winch is involved. In one embodiment, the system 100 is a part of a pile driving system. The device 100 senses changes in hoist torque and tool height and can be used to precisely control slack on the cable, which is or special import in such applications as pile driving.

The system 100 may be used in connection with one or more similar devices mounted on one or more secondary hoists or winches on the same crane. These devices may be connected through wired or wireless systems, wherein the multiple devices work together to assemble correct LMI or usage information. One device may be used as the primary or master gathering point for this LMI and usage information.

In various embodiments, the systems of the present disclosure eliminate the need for measuring hydraulic boom cylinder pressure. Consequently, LMI system installation on cranes is faster and less expensive and requires less electrical wiring and hydraulic hose routing, resulting in an easier to assembly and more maintenance-friendly system than known systems. The HMI system of the present disclosure may be used on hoist infrastructures and can be used in rough terrain, all-terrain, offshore, lattice-crane, and tower-crane environments. It should also be understood that the systems of the present disclosure can be used in winch applications in which loads are pulled, as well as in hoists where loads are lifted.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
a cable drum that receives a length of working cable that is wound in and out from the drum in response to powered rotation of the drum with an uppermost layer of working cable on the drum forming a working surface;
a torque sensor in mechanical communication with the cable drum that measures a torque applied to the cable drum due to tension on the working cable from a load;
a drum height gauge for measuring a height of the working surface of the cable on the cable drum relative to the cable drum;
a processor that receives the torque from the torque sensor and the height of the working surface from the drum height gauge and computes a force applied to the length of working cable due to the load based on the torque and height of the working surface;
wherein the torque sensor is a magnetic sensor.

2. The system of claim 1, wherein the torque sensor measures the torque applied to a component in a torque path interposing the cable drum and a power source.

3. The device of claim 1, wherein the drum height gauge comprises a cable packer assembly with an angle sensor.

4. The device of claim 1, wherein the processor is incorporated into a load moment indicator.

5. The device of claim 1, wherein the processor is incorporated into a drum rotation indicator.

6. A system comprising:
a cable drum that receives a length of working cable that is wound in and out from the drum in response to powered rotation of the drum with an uppermost layer of working cable on the drum forming a working surface;
a torque sensor in mechanical communication with the cable drum that measures a torque applied to the cable drum due to tension on the working cable from a load;
a drum height gauge for measuring a height of the working surface of the cable on the cable drum relative to the cable drum;
a processor that receives the torque from the torque sensor and the height of the working surface from the drum height gauge and computes a force applied to the length of working cable due to the load based on the torque and height of the working surface; and
a display device affixed proximate an end of the drum, the display device providing a numerical readout of the computed force on the working cable.

7. The system of claim 6, wherein the torque sensor measures the torque applied to a component in a torque path interposing the cable drum and a power source.

8. The device of claim 6, wherein the drum height gauge comprises a cable packer assembly with an angle sensor.

9. The device of claim 6, wherein the processor is incorporated into a load moment indicator.

10. The device of claim 6, wherein the processor is incorporated into a drum rotation indicator.

* * * * *